United States Patent [19]

Rozek et al.

[11] Patent Number: 5,022,312
[45] Date of Patent: Jun. 11, 1991

[54] PLASTIC PISTON HEAD ASSEMBLY

[75] Inventors: Roy J. Rozek, Plymouth; Mark O'Connell, Cedar Grove, both of Wis.

[73] Assignee: Thomas Industries, Sheboygan, Wis.

[21] Appl. No.: 470,806

[22] Filed: Jan. 26, 1990

[51] Int. Cl.⁵ .............................................. F16J 9/00
[52] U.S. Cl. ................................. 92/240; 92/248; 92/245; 277/152; 156/73.1
[58] Field of Search ................. 92/192, 240, 241, 242, 92/243, 244, 245, 248, 249, 250, 254; 277/152, 277; 156/73.1

[56] References Cited

U.S. PATENT DOCUMENTS

| 1,338,765 | 5/1920 | Brandt | 92/250 |
|---|---|---|---|
| 2,029,367 | 2/1936 | Geyer | 92/245 |
| 2,246,685 | 3/1940 | Johnsen | 92/240 |
| 2,836,474 | 5/1958 | Mosher | 92/250 |
| 2,911,270 | 11/1959 | White | 92/244 |
| 2,914,369 | 11/1959 | Hayman | 92/240 |
| 2,985,358 | 5/1961 | Lee et al. | 92/240 |
| 3,040,712 | 6/1962 | Harrah | 92/248 |
| 3,062,601 | 11/1962 | Sadler et al. | 92/240 |
| 3,082,935 | 3/1963 | Arak | 92/240 |
| 3,902,405 | 9/1975 | Costarella et al. . | |
| 4,171,665 | 10/1979 | Stoll | 92/250 |
| 4,214,507 | 7/1980 | Hock et al. . | |
| 4,515,378 | 5/1985 | Marshall | 92/243 |
| 4,521,027 | 6/1985 | Marshall | 92/243 |
| 4,581,984 | 4/1986 | Greenberg et al. | 92/240 |
| 4,637,295 | 1/1987 | Powers et al. | 277/152 |
| 4,730,550 | 3/1988 | Bramstedt et al. . | |

FOREIGN PATENT DOCUMENTS

| 2426023 | 1/1975 | Fed. Rep. of Germany | 92/250 |
|---|---|---|---|
| 872606 | 6/1942 | France | 92/240 |
| 204322 | 4/1939 | Switzerland | 92/240 |
| 634312 | 3/1950 | United Kingdom | 92/240 |

OTHER PUBLICATIONS

*How To Get Good Ultrasonic Welds,* Modern Plastics, 11/64, 5 sheets.

Primary Examiner—John T. Kwon
Assistant Examiner—Thomas Denion
Attorney, Agent, or Firm—Hill, Van Santen, Steadman & Simpson

[57] ABSTRACT

A piston having a cup seal retainer assembly wherein the cup seal is secured between an underside of a circumferential flange of the piston and a retainer ring that is secured to the underside of the piston.

6 Claims, 1 Drawing Sheet

U.S. Patent  June 11, 1991  5,022,312
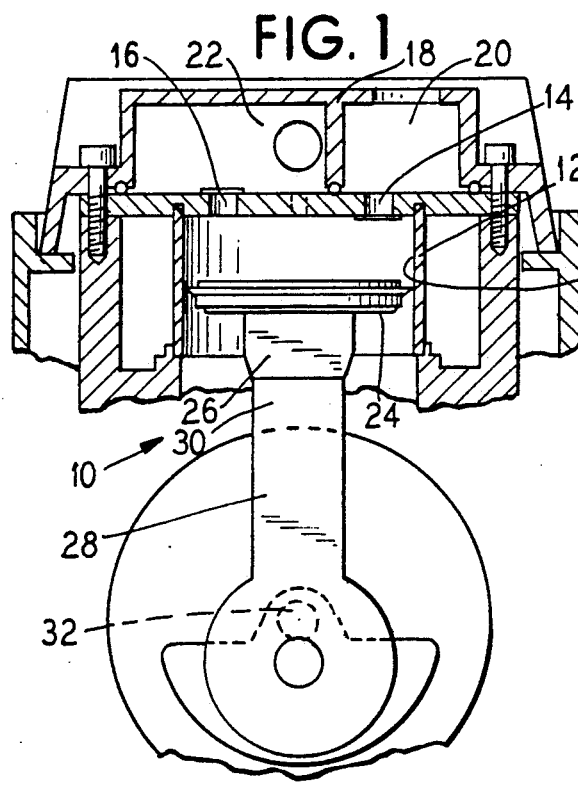
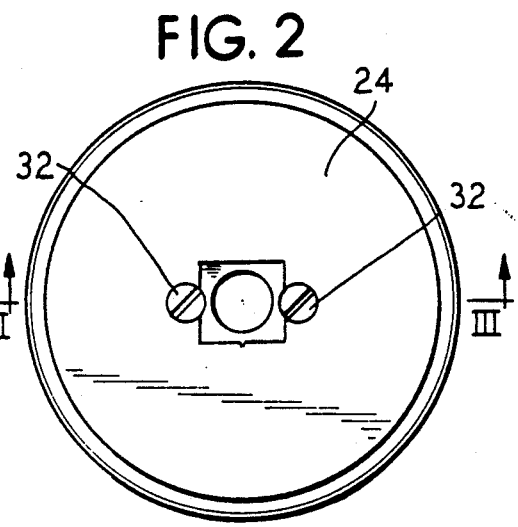
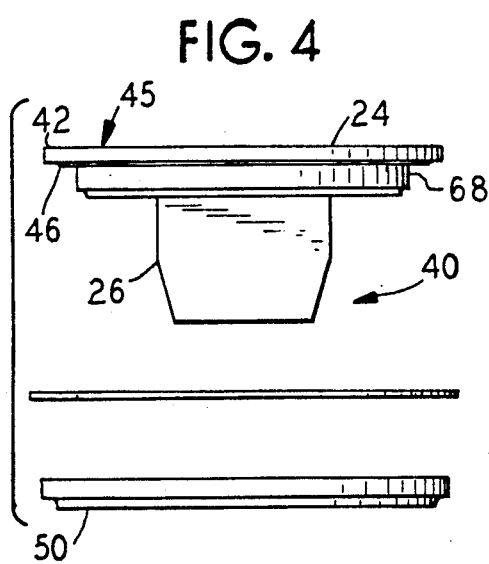
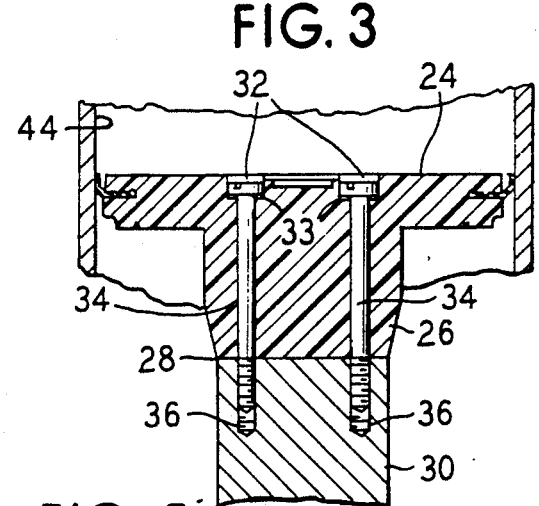
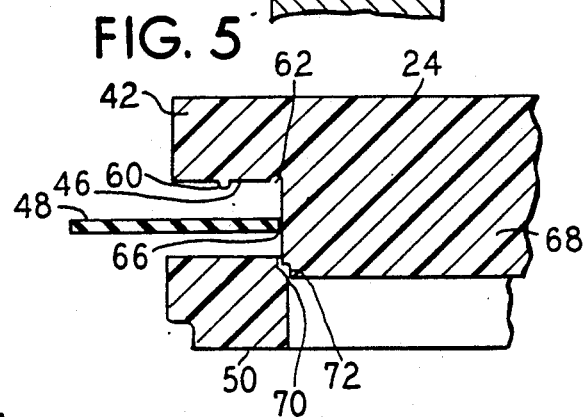
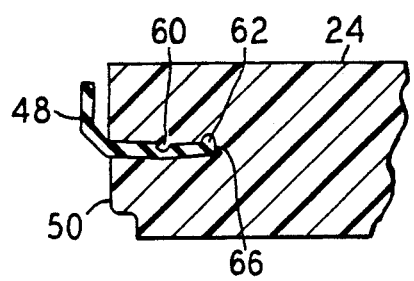

PLASTIC PISTON HEAD ASSEMBLY

BACKGROUND OF THE INVENTION

The present invention generally is directed to pistons. More specifically, the invention is directed to pistons that employ cup seals that are attached to the piston head. Additionally, the present invention is directed to pistons made of a plastic material.

Wobble-type pistons are known as are cup seals. Additionally, it is known to construct wobble-type pistons employing two-piece rods. Further, it is known to make pistons out of plastic.

In U.S. Pat. No. 4,730,550, there is disclosed a two-piece piston rod construction wherein an upper portion of a piston rod is integrally formed with a piston of a wobble-type piston. The upper piston rod portion is secured to a lower piston rod portion by means of bolts that extend through the working surface of the piston, through the upper piston rod portion, and into the lower piston rod portion.

Current practice in the assembly of cup seals and pistons is to clamp a cup seal onto an upper surface of a piston by securing the cup seal between the piston and a disk. A typical example is disclosed in U.S. Pat. No. 4,730,550.

Because the cup seals are assembled down onto the piston, piston stack height control is frustrated due to variations in the clamping of the disk securing the cup seal to the piston. Additionally, the various cup seals can exhibit different compression characteristics resulting in different piston heights.

SUMMARY OF THE INVENTION

The present invention provides a plastic piston head wherein a cup seal is easily and quickly permanently secured to a piston head and critical piston stack height can be repeatedly maintained.

To these ends, the invention provides a plastic piston head including a flange that extends radially from the working surface of the piston. An annular cup seal is sandwiched between an under side of the flange and an annular retainer ring that is secured against the underside of the flange, preferably by sonic welding so that the ring and piston head fuse together about the seal to form a unitary member.

In another embodiment, the piston head flange includes a circumferential sealing rib and a cup seal lock and plastic flow groove at an inside diameter of the flange.

In a further embodiment, the invention includes a two-piece piston rod construction.

Accordingly, an advantage of the invention is an improved piston and cup seal assembly.

Another advantage of the invention is that critical piston stack height can be controlled without regard to the particular cup seal employed.

A further advantage of the invention is the ease of service of a pump employing the piston and cup seal assembly due to the easy replacement of one of the piston and/or rod of the assembly.

Yet another advantage of the invention is a piston and cup seal that is readily and easily assembled.

The invention and these and other advantages will become more apparent with reference to the following detailed description of the preferred embodiment and accompanying drawings.

BRIEF DESCRIPTION OF THE DRAWINGS

FIG. 1 is a cross-sectional view of a piston and cylinder assembly employing a piston embodying principles of the invention;

FIG. 2 is a plan view of the piston of FIG. 1;

FIG. 3 is a cross-sectional view of the piston and cylinder assembly of FIG. 1, generally taken along the line III—III;

FIG. 4 is an exploded view of the piston head of the piston in FIG. 1 illustrating assembly of the piston head;

FIG. 5 is a cross-sectional view of a portion of the piston head of the piston of FIG. 1 illustrating assembly of the piston head; and FIG. 6 is a cross-sectional view of the portion of the piston head of FIG. 5 illustrating the resulting piston head structure.

DETAILED DESCRIPTION OF THE PRESENTLY PREFERRED EMBODIMENTS

A piston and cylinder assembly 10 is illustrated in FIG. 1. A cylinder 12 of the assembly 10 is connected via valve openings 14 and 16 for fluid communication with a cylinder manifold 18 having fluid inlet and outlet chambers 20 and 22, respectively. A wobble type piston 24 (i.e., wherein the piston is not hingedly attached to the rod) embodies principles of the invention as will be discussed below.

In the illustrated embodiment, the piston 24 is described as an upper rod section 26, and is attached to a lower rod section 28. The upper portion 26 of the piston rod is removably secured to an upper portion 30 of the lower piston rod portion 28. The lower portion 28 of the piston rod, in turn, is secured to a crank 32 for appropriate reciprocating action. The two-piece piston rod construction is the subject of U.S. Pat. No. 4,730,550, assigned to the assignee of the present application. The disclosure of this patent is fully incorporated herein.

As illustrated most clearly in FIGS. 2 and 3, the upper piston rod portion 26 is secured to the lower piston rod portion 28 by means of screws 32 that extend through appropriate axial bores 34 formed in the upper piston rod portion 26. The screws 32 engage bores 36 formed in an axial end of the lower piston rod portion 30.

The piston 24 incorporates therein a seal cup assembly 40, as is most clearly illustrated in FIGS. 4-6. As illustrated, the upper piston 26 includes a radially extending flange 42 that forms a portion of the working surface 45 of the piston 26. As such, the perimeter of the flange 42 defines the perimeter of the piston 24 and the surface that is adjacent the inner cylindrical surface 44 of the cylinder 12.

An underside 46 of the flange 42 serves as a top clamping surface for clamping an annular cup seal ring 48. A retainer ring 50 serves to provide a bottom clamping surface for clamping the cup seal 48 to the piston 26. During assembly, the cup seal 48 is positioned against the underside 46 of the flange 42 and then the retainer ring 50 is secured against the cup seal 48 to clamp the seal 48 therebetween. In the structure illustrated, the retainer ring 50 is secured to the rod portion 26 by ultrasonic welding, although various other methods of interference or mechanical fastening would be alternately acceptacle.

In FIG. 5, it can be seen that the underside or bottom surface 46 of the flange 42 includes a circumferential seal rib 60 thereon. Additionally, the underside 46 includes a circumferential cup lock and plastic flow groove 62 positioned at the corner of the junction between the flange 42 and the upper piston rod portion 26.

The rib 60 serves two functions. The rib 60 provides added sealing between the space above the working surface 45 of the piston 24 and the space below the piston 24 within the cylinder 12. It can be appreciated that, as illustrated in FIG. 5, the rib 60 extends into the cup seal 48 to prevent passage of fluid over the upper surface of the cup seal 48. Further, the rib 60 serves to grip the cup seal 48 and to retain the cup seal in its clamped position.

The groove 62 also serves two functions. The groove 62 similarly serves to grip the cup seal 48 and to lock the seal 48 in place as the inner circumferential edge 66 of the seal 48 is forced into the groove 62 during assembly. Additionally, the groove 62 provides a space into which molten plastic can flow during the sonic welding of the retainer ring 50 to the piston 24.

Force fitting of the ring 50 onto the piston 24 is necessitated because an interior diameter of the ring 50 is just equal to or less than the outer diameter of a lower cylinder portion 68 of the piston 24 that is to say, the respective diameters overlap to a small degree. As such, it is difficult to position the ring 50 onto the piston 24.

To assist in the positioning of the ring 50 onto the piston 24, the ring 50 and the piston 24 include cooperating circumferential notches 70 and 72, respectively. Essentially, the upper edge of the inner diameter of the ring 50 and the lower outer diameters of the lower cylindrical portion 68 are notched so that the ring 50 partially engages about the lower cylindrical portion 68 prior to assembly. Once positioned, the ring 50 can be secured onto the piston 24.

In the illustrated preferred embodiment, the piston 24 and ring 50 preferably comprise glass reinforced plastic material. A number of reinforced plastic materials of this type are available from a variety of resin suppliers, many of which would perform satisfactorily.

In can be appreciated from the foregoing that, due to unique assembly of the cup seal onto the piston, the seal cup 48 can be secured to the piston 24 via insertion from the bottom up, thus allowing better control of the critical stack height of the piston assembly. Further, the sonic welding provides a unitary structure as set forth above.

While a preferred embodiment has been shown, modifications and changes may become apparent to those skilled in the art which shall fall within the spirit and scope of the invention. It is intended that such modifications and changes be covered by the attached claims.

We claim as our invention:

1. A piston comprising:
   a main cylindrical body having a top surface with an edge, a bottom edge, and a vertical side;
   a flange extending radially and horizontally from said edge of said top of said main body;
   a centrally disposed boss extending downwardly from an underside of said main body, said boss being less in diameter than said main body;
   a circumferential notch provided in said bottom edge;
   an annular cup seal engaged against said underside of said flange, said cup seal having an outer diameter greater than that of said flange; and
   an annular retainer ring sonically welded to said underside of said flange so as to secure said cup seal therebetween.

2. The piston of claim 1, wherein an underside of said flange includes a downwardly extending bead spaced from said side of said main body.

3. The piston of claim 2, wherein said underside of said flange includes a circumferential recess extending into said flange and disposed adjacent said side of said main body.

4. The piston of claim 3, wherein said annular retainer ring includes a circumferential notch disposed in an interior upper edge, said circumferential notch cooperating with said notch in said bottom edge of said main body to ease press fitting of said ring about said main body.

5. The piston of claim 4, wherein said main body, said flange, and said retainer ring comprise a unitary plastic body following sonic welding of said retainer ring to said flange.

6. A piston head comprising:
   a plastic body having a circular periphery whose diameter varies over an axial length of the body, such that a top portion of the body includes a radial flange to form a disk member while a lower portion forms a cylindrical member;
   a plastic annular ring that is press fit about said lower portion of said body and sonically welded to said flange;
   an annular cup seal secured between said annular ring and said flange, said cup seal having an outer periphery that is greater in diameter than a diameter of said disk member top portion; and
   a plastic piston rod boss extending downwardly from said body, said plastic piston rod boss, said body, and said ring forming a unitary body.

* * * * *